United States Patent
Hauck

(10) Patent No.: US 10,359,084 B2
(45) Date of Patent: Jul. 23, 2019

(54) PULLEY DECOUPLER

(71) Applicant: Schaeffler Technologies AG & Co. KG, Herzogenaurach (DE)

(72) Inventor: Christian Hauck, Altdorf (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 95 days.

(21) Appl. No.: 15/549,289

(22) PCT Filed: Mar. 16, 2016

(86) PCT No.: PCT/DE2016/200143
§ 371 (c)(1),
(2) Date: Aug. 7, 2017

(87) PCT Pub. No.: WO2016/155725
PCT Pub. Date: Oct. 6, 2016

(65) Prior Publication Data
US 2018/0038424 A1 Feb. 8, 2018

(30) Foreign Application Priority Data
Mar. 27, 2015 (DE) .......... 10 2015 205 612

(51) Int. Cl.
*F16D 3/12* (2006.01)
*F16D 3/72* (2006.01)
(Continued)

(52) U.S. Cl.
CPC ............ *F16D 41/066* (2013.01); *F16D 3/12* (2013.01); *F16D 3/72* (2013.01); *F16D 41/06* (2013.01);
(Continued)

(58) Field of Classification Search
CPC ........ F16H 7/0827; F16H 55/49; F16H 55/32; F16D 41/066; F16D 2041/0605; F02B 67/06
See application file for complete search history.

(56) References Cited

U.S. PATENT DOCUMENTS 7,207,910 B2 * 4/2007 Dell .................. F16H 55/36
474/74
8,047,920 B2   11/2011 Jansen et al.
(Continued)

FOREIGN PATENT DOCUMENTS

EP   2258968   12/2010
EP   2511557   10/2012
(Continued)

*Primary Examiner* — Michael R Mansen
*Assistant Examiner* — Mark K Buse
(74) *Attorney, Agent, or Firm* — Volpe and Koenig, P.C.

(57) ABSTRACT

A decoupler is provided for rotationally driving a generator of an auxiliary-unit belt drive of an internal combustion engine, including: a pulley, a hub, and two bearing points, at which the pulley is rotatably supported on the hub, a series arrangement of a helical torsion spring and a one-way clutch, which allows the hub to overtake the pulley, and a spring plate, which is rotationally fixed in relation to the pulley or the hub, for the one spring end and a spring plate, which can be rotated in relation to the pulley and the hub, for the other spring end. The spring ends, which lie against ramp steps of the spring plates, radially expand the helical torsion spring as the driving torque is transmitted. The frictional torque, produced in one of the bearing points when the hub is overtaking, acts on the rotatable spring plate in a direction of rotation of the rotationally fixed spring plate. The other bearing point, according to the invention, has a part that is rotationally fixed in relation to the rotationally fixed spring plate, on which part the rotatable spring plate is supported, a further frictional torque thus being produced, which acts on the rotatable spring plate in the direction of rotation of the rotationally fixed spring plate.

14 Claims, 2 Drawing Sheets

Figure 1:
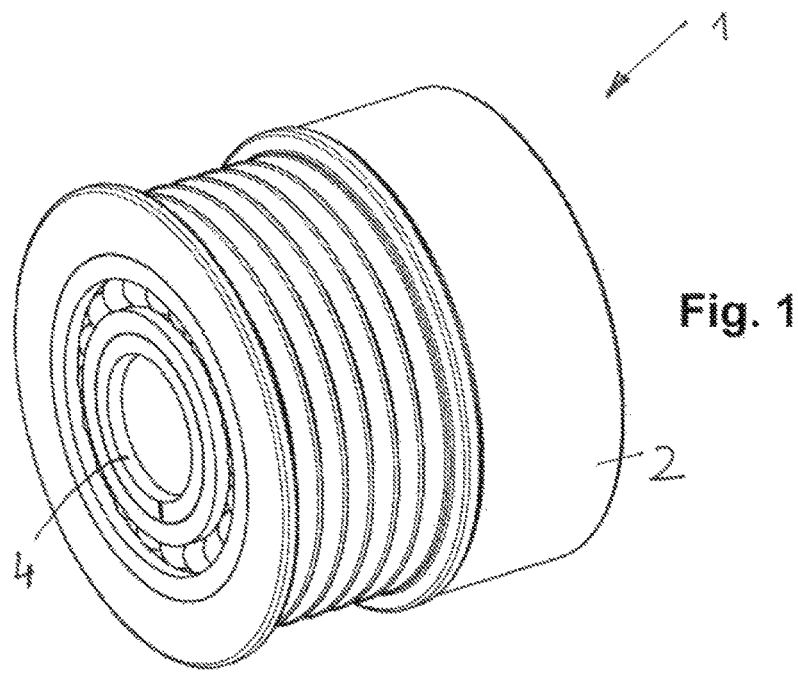

(51) Int. Cl.
*F16H 7/08* (2006.01)
*F02B 67/06* (2006.01)
*F16H 55/49* (2006.01)
*F16H 55/36* (2006.01)
*F16D 41/066* (2006.01)
*F16D 41/06* (2006.01)
*F16D 47/02* (2006.01)

(52) U.S. Cl.
CPC ........... *F16D 47/02* (2013.01); *F16H 7/0827* (2013.01); *F16H 55/36* (2013.01); *F16H 55/49* (2013.01); *F02B 67/06* (2013.01); *F16D 2041/0605* (2013.01)

(56) References Cited

U.S. PATENT DOCUMENTS

| | | | | |
|---|---|---|---|---|
| 2011/0065537 | A1* | 3/2011 | Serkh | F16D 7/022 |
| | | | | 474/94 |
| 2013/0324335 | A1* | 12/2013 | Chen | F16D 41/206 |
| | | | | 474/94 |
| 2015/0184703 | A1* | 7/2015 | Shimamura | F16D 3/74 |
| | | | | 192/41 S |
| 2015/0260265 | A1 | 9/2015 | Agnitch et al. | |
| 2016/0169302 | A1* | 6/2016 | Mori | F16F 15/123 |
| | | | | 474/166 |

FOREIGN PATENT DOCUMENTS

| | | |
|---|---|---|
| FR | 2382615 | 9/1978 |
| JP | 2008180261 | 8/2008 |
| WO | 2009031569 | 3/2009 |
| WO | 2013191240 | 12/2013 |
| WO | 2014056096 | 4/2014 |
| WO | 2015012053 | 1/2015 |

\* cited by examiner

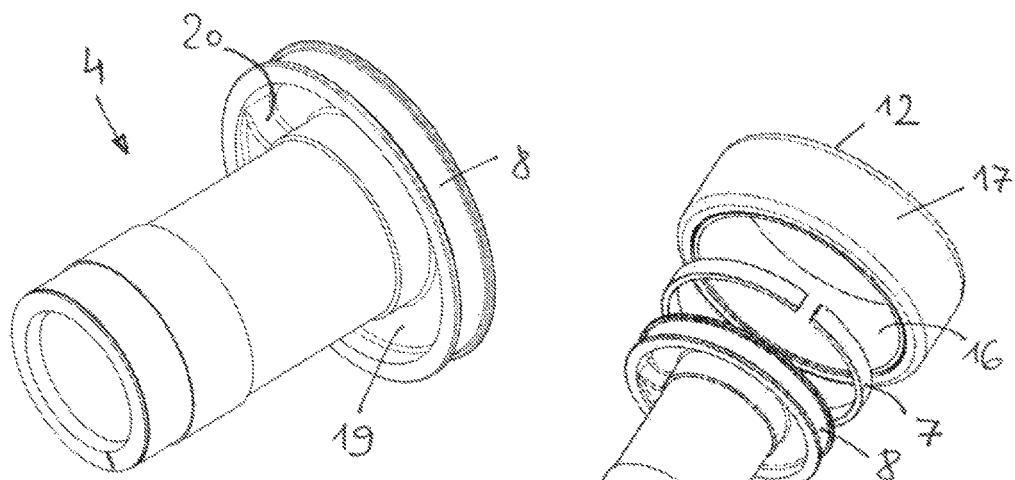
Fig. 4
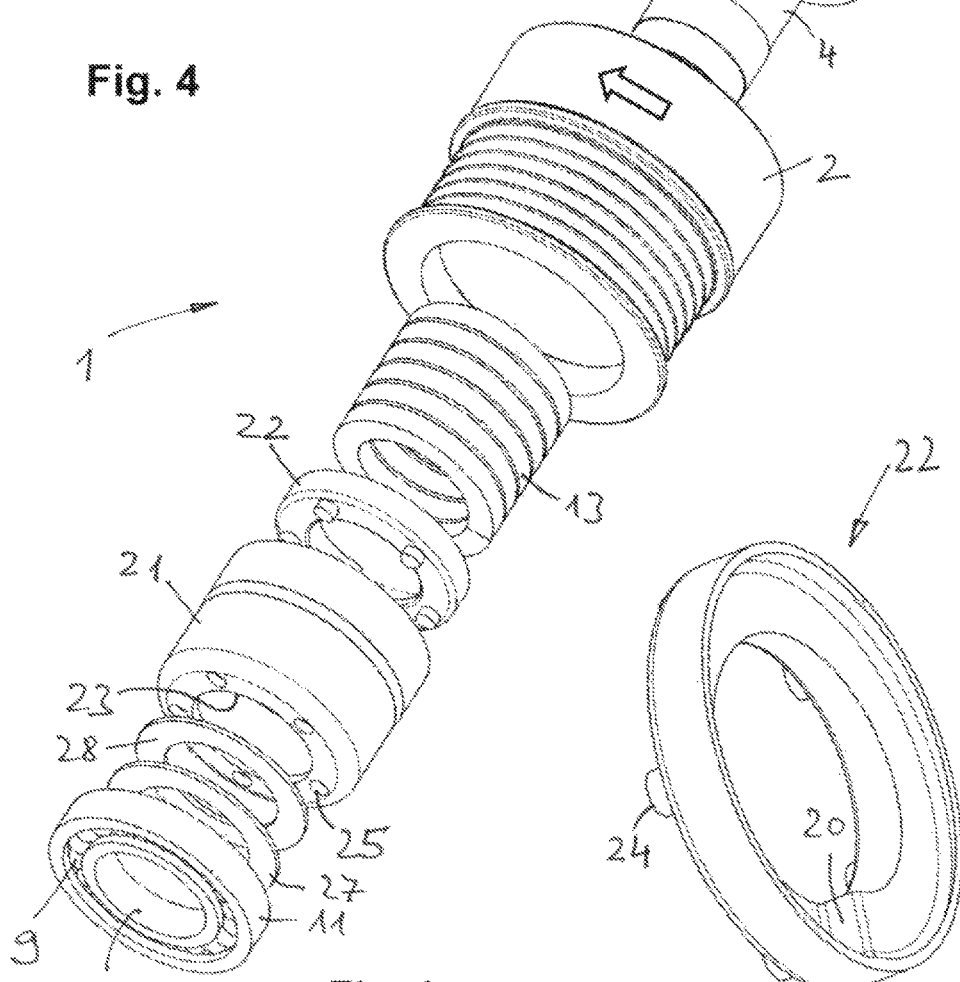
Fig. 3
Fig. 5

PULLEY DECOUPLER

BACKGROUND

The invention relates to a decoupler for the rotational drive of a generator of an auxiliary unit belt drive of an internal combustion engine, with:
  a belt pulley rotationally driven by the belt,
  a hub that rotationally drives the shaft of the generator and is arranged radially inside the belt pulley,
  two axially spaced bearing points at which the belt pulley is supported so that it can rotate on the hub,
  a series arrangement radially between the belt pulley and the hub formed of a helical torsion spring and a one-way coupling that allows the hub to overtake the belt pulley in the driving rotational direction,
  a spring plate that is rotationally fixed relative to the belt pulley or the hub for the one end of the helical torsion spring and a spring plate that can rotate relative to the belt pulley and the hub for the other end of the helical torsion spring,
The spring plates each rise up to a step axially with a ramp-like shape and the spring ends contacting the ramp steps expand the helical torsion spring radially while transferring the drive moment. Here, the friction moment generated in one of the bearing points by the overrunning hub loads the rotating spring plate in the rotational direction of the rotationally fixed spring plate.

Such decouplers compensate for known rotational oscillations and non-uniformity of the crankshaft transmitted via the auxiliary unit belt drive to the generator. The series arrangement made from the one-way coupling and the helical torsion spring transfers, in the closed state of the one-way coupling, the drive moment of the belt via the belt pulley and the hub to the shaft of the generator, wherein the elasticity of the helical torsion spring smooths the rotational non-uniformity. For a delayed rotating belt pulley, the one-way coupling opens, wherein—then inversely—no significant torque can be transferred from the hub to the belt pulley and the generator shaft with relatively large mass inertia overtakes the belt pulley.

The location of this decoupling effect can also be directly on the crankshaft as is generally known, wherein then the helical torsion spring and the one-way coupling connected in series, for appropriate dimensioning and matching to the reversed flow of drive torque, are part of a so-called crankshaft decoupler that is positioned on the crankshaft and drives the entire auxiliary unit belt drive.

A generator decoupler according to the class is disclosed, for example, in EP 2 258 968 A1. The one-way coupling is a clamping body overriding clutch that is arranged downstream of the belt pulley on the hub with respect to the flow of drive torque, i.e., behind the helical torsion spring and is consequently arranged directly on the hub. The rotating bearing of the belt pulley is realized on the generator side by a ball bearing and opposite this, on one hand, by a sliding bearing ring in which the rotating spring plate is supported and, on the other hand, by another ball bearing that supports the rotating spring plate on the hub.

Although the one-way coupling is open for an overrunning hub, the unavoidable residual friction moment of the coupling can lead to a relative rotation of the two spring plates, wherein one or two ends of the helical torsion spring are at a distance from the surrounding ramp steps of the spring plates and run upward at their ramps. The effectively decreasing axial installation space due to the ramp geometry can have the effect for the helical torsion spring that the helical torsion spring presses the two spring plates axially apart from each other and thus the decoupler more or less jumps axially. A similarly undesired consequence is the noticeable acoustics of the decoupler when one or both spring ends repeatedly run up the ramps and snap back to the ramp steps after each rotation.

This problem in the ramp run-up is corrected in a decoupler as known from U.S. Pat. No. 8,047,920 B2 by a mechanism that prevents relative rotation of the two spring plates by opposing stops for an overrunning hub. Such a mechanism can be required, in particular, if the one-way coupling—as in this publication—is a looped belt whose residual friction in the opened state is naturally so large it forces the ramp run-up.

SUMMARY

The present invention is based on modifying a decoupler of the type specified above so that the undesired run-up of spring ends on the ramps of the spring plates is prevented.

The solution here is given from the features described below. Consequently, the other bearing point should have a part that is rotationally fixed relative to the rotationally fixed spring plate and on which the rotating spring plate is supported while generating another friction moment that loads the rotating spring plate in the rotational direction of the rotationally fixed spring plate.

Thus, the rotating spring plate is loaded by at least two bearing points with friction moments that act together in the overrunning operation of the decoupler and thus have a reinforcing effect in the rotational direction of the rotationally fixed spring plate. The rotating spring plate is thus triggered according to the invention only by sufficiently high friction moments, without rotating at a relative rotational speed relative to the rotationally fixed spring plate. This significantly reduces the risk explained above that, for an overrunning hub, the spring ends run up the ramps of the spring plate due to their relative rotation. The risk is especially low if the one-way coupling has a significantly lower residual friction moment in the opened state than a looped belt and is, for example, a clamping body overriding clutch. In one especially preferred construction, the one-way coupling should be a clamping roller overriding clutch.

Depending on the sequence of helical torsion springs and one-way couplings within the series circuit, the following states occur in the overrunning operation of the decoupler:
  When (as in the prior art cited above) the one-way coupling is positioned behind the helical torsion spring, the rotating spring plate is then located above the two bearing points in double friction contact with the overtaken belt pulley that is rotationally fixed relative to the rotationally fixed spring plate.
  When (in the reversed case) the one-way coupling is positioned in front of the helical torsion spring, because then the rotating spring plate is located rotationally fixed by the two bearing points in doubled friction contact with the overrunning hub that is rotationally fixed relative to the spring plate.

BRIEF DESCRIPTION OF THE CLAIMS

Additional features of the invention are given from the subsequent description and the drawings in which a decoupler according to the invention is shown for the generator of an auxiliary unit belt drive of an internal combustion engine. Shown are:
  FIG. 1 the decoupler in perspective view,
  FIG. 2 the decoupler in longitudinal section,
  FIG. 3 the decoupler in a perspective exploded view, FIG. 4 the hub of the decoupler in a perspective individual view, and FIG. 5 the rotating spring plate of the decoupler in a perspective individual view.

DETAILED DESCRIPTION

Figure 2:
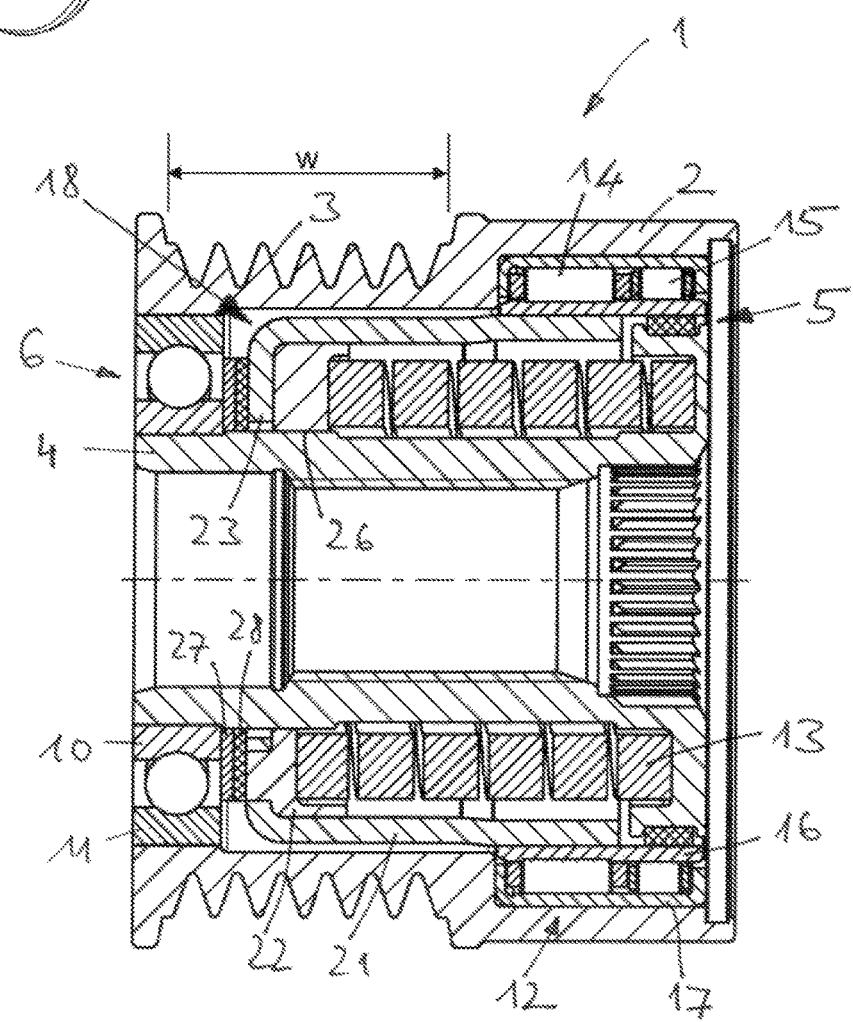

The decoupler 1 shown in FIGS. 1 to 3 is arranged on the generator of an auxiliary unit belt drive of an internal combustion engine. The decoupler 1 comprises a rotationally driven belt pulley 2 that is provided in the axial area w drawn in FIG. 1 with a profiled belt groove 3 for the driving poly-V belt. The hub 4 arranged radially inside the belt pulley 2 is bolted tightly to the shaft of the generator in a known manner. The rotational bearing of the belt pulley 2 on the hub 4 is realized at two bearing points 5 and 6 on the axial ends of the decoupler 1. The bearing point 5 on the right in FIG. 2 is located on the screw-in side of the decoupler 1 away from the generator and is formed by a sliding bearing ring 7 made from plastic that surrounds a sliding bearing section 8 of the hub 4. The other bearing point 6 on the left in FIG. 2 is located on the generator side and is formed by a ball bearing 9 whose inner ring 10 is mounted on the hub 4 and whose outer ring 11 is mounted in the belt pulley 2.

The elastic transmission of the drive moment from the belt pulley 2 to the hub 4 is realized by a series arrangement that extends radially between the belt pulley 2 and the hub 4 and is made from a one-way coupling 12 and a helical torsion spring 13. The one-way coupling 12 is a clamping roller overriding clutch that forms a structural unit with a clamping roller row 14, a support bearing row 15 axially adjacent to the clamping roller row, an inner ring 16 provided with clamping ramps in the area of the clamping roller row 14, and an outer ring 17. This extends radially outside of the helical torsion spring 13 at the expense of the smallest possible loop diameter of the belt and axially completely outside of the area w of the belt groove 3. The overriding clutch outer ring 17 is pressed into a diameter extension of the belt pulley 2 adjacent to the belt groove 3 and the overriding clutch inner ring 16 encloses the sliding bearing ring 7.

The helical torsion spring 13 is clamped with leg-less spring ends between a spring plate 18 that can rotate relative to the belt pulley 2 and the hub 4 and a spring plate 19 that is rotationally fixed relative to the hub 4. As can be seen in FIGS. 4 and 5, both spring plates 18, 19 increase axially with a ramp-like shape, so that the spring ends contacting the ramp steps 20 on the ends radially expand the helical torsion spring 13 when this transmits the driving torque from the belt pulley 2 to the hub 4.

The rotationally fixed spring plate 19 on which the one spring end contacts is constructed in one piece on the hub 4 and its outer lateral surface forms the sliding bearing section 8. The rotating spring plate 18 on which the other spring contacts has a two-part construction and comprises a cylindrical sheet metal formed part 21 and a spring contact part 22 rotationally fixed therein and on which the ramp step 20 is formed. The sheet metal formed part 21 is pressed onto one end in the overriding clutch inner ring 16 and has, at the other end, a radially inward running collar 23 for the rotationally fixed support of the spring contact part 22. The rotational fixing is realized by multiple, in the present case, five axial projections 24 on the spring contact part 22 that engage in corresponding openings 25 in the collar 23. As an alternative, the overriding clutch inner ring 16 and the sheet metal formed part 21 and also the spring contact part 22 can be combined into a one-piece and, for example, sintered component.

The rotating spring plate 18 is supported on one side by the overriding clutch inner ring 16 on the one bearing point 5 and on the other side by the spring contact part 22 on a bearing point 26 radially on the hub 4 and also supported axially against the ball bearing 9. The axial support is realized by a metallic thrust washer 27 and an adjacent sliding bearing washer 28 made from plastic that are clamped between the bearing inner ring 10 and the collar 23 with the axial pre-tensioning force of the helical torsion spring 13. Thus, the bearing inner ring 10 forms a part that is also rotationally fixed relative to the rotationally fixed spring plate 19 and on which the rotating spring plate 18 is supported.

The belt drives the belt pulley 2 of the decoupler 1 in the rotational direction drawn in FIG. 3. In the operating state in which the generator shaft is driven by the hub 4, the clamping roller overriding clutch 12 is closed and transmits the drive moment via the overriding clutch inner ring 16, the rotating spring plate 18, and the helical torsion spring 13 to the rotationally fixed spring plate 19. The helical torsion spring 13 here enables relative rotations of the two spring plates 18, 19 relative to each other and thus relative rotations of the belt pulley 2 relative to the generator shaft. In another operating state with negative rotational speed difference between the (relatively slowly rotating) belt pulley 2 and the (relatively quickly rotating) generator shaft, the opened clamping roller overriding clutch 12 enables the hub 4 to overtake the belt pulley 2. A resulting relative rotation of the two spring plates 18, 19 relative to each other and the associated ramp run-up of the spring ends is prevented such that the two spring plates 18, 19 rotate at the same rotational speed. This rotational speed synchronization is realized only through friction moments that are in the same direction and are picked up by the rotating spring plate 18 at the three bearing points 5, 6, and 26 from the (rotationally fixed with the rotationally fixed spring plate 19) hub 4. In total, the rotating spring plate 18 is loaded with the friction moment of the radial sliding bearing ring 7, the friction moment of the axial sliding bearing washer 28, and the friction moment of the bearing point 26, wherein this total moment is significantly greater than the residual friction moment of the opened clamping roller overriding clutch 12 that acts via the overriding clutch inner ring 16 also on the rotating spring plate 18, but in the opposite rotational direction.

LIST OF REFERENCE NUMBERS

1 Decoupler
2 Belt pulley
3 Belt groove
4 Hub
5 Bearing point
6 Bearing point
7 Sliding bearing ring
8 Sliding bearing section
9 Ball bearing
10 Bearing inner ring
11 Bearing outer ring
12 One-way coupling/clamping roller overriding clutch
13 Helical torsion spring
14 Clamping roller row
15 Support bearing row
16 Overriding clutch inner ring
17 Overriding clutch outer ring 18 Rotating spring plate
19 Rotationally fixed spring plate
20 Ramp stage
21 Sheet metal formed part
22 Spring contact part
23 Collar
24 Projection
25 Opening
26 Bearing point
27 Thrust washer
28 Sliding bearing washer

The invention claimed is:

1. A decoupler for a rotational drive of a generator of an auxiliary unit belt drive of an internal combustion engine, the decoupler comprising:
a belt pulley adapted to be rotationally driven by a belt;
a hub that is adapted to rotationally drive a shaft of the generator arranged radially inside the belt pulley;
two axially spaced bearing points at which the belt pulley is supported for rotation on the hub;
a series arrangement radially between the belt pulley and the hub formed of a helical torsion spring and a one-way coupling that allows the hub to overtake the belt pulley in a driving rotational direction to form an overrunning hub;
a rotationally fixed spring plate that is rotationally fixed relative to the belt pulley or the hub for one end of the helical torsion spring and a rotating spring plate that rotates relative to the belt pulley and the hub for another end of the helical torsion spring;
wherein the rotationally fixed spring plate and the rotating spring plate each rise up to a step axially with a ramp shape, and spring ends of the helical torsion spring contact the ramp steps to expand the helical torsion spring radially while transferring a drive moment and a friction moment generated in one of the bearing points by the overrunning hub loads the rotating spring plate in a rotational direction of the rotationally fixed spring plate, the other bearing point has a part that is rotationally fixed relative to the rotationally fixed spring plate and on which the rotating spring plate is supported while generating another friction moment that loads the rotating spring plate in the rotational direction of the rotationally fixed spring plate,
the clamping roller overriding clutch extends axially completely outside of a belt groove in the belt pulley, and
the one bearing point is formed by a sliding bearing ring that surrounds the hub and is enclosed by an inner ring of the clamping roller overriding clutch.

2. The decoupler according to claim 1, wherein the clamping roller overriding clutch extends axially completely outside of a belt groove in the belt pulley.

3. The decoupler according to claim 1, wherein the rotating spring plate comprises a cylindrical sheet metal formed part that is mounted in the inner ring of the clamping roller overriding clutch.

4. The decoupler according to claim 3, wherein the rotating spring plate comprises a spring contact part that is held in the sheet metal formed part and on which the ramp step is formed and forms a contact secured against rotation on a radially inward extending collar of the sheet metal formed part.

5. The decoupler according to claim 1, wherein the other bearing point is a ball bearing having an inner ring that is mounted on the hub and axially supports the rotating spring plate.

6. The decoupler according to claim 5, wherein the inner ring of the ball bearing supports the rotating spring plate by a metallic support washer and a sliding bearing washer made from plastic.

7. A decoupler for use in an internal combustion engine, the decoupler comprising:
a belt pulley;
a hub that is adapted to rotationally drive a shaft of a load arranged radially inside the belt pulley;
two axially spaced bearing points at which the belt pulley is supported for rotation on the hub;
a series arrangement radially between the belt pulley and the hub formed of a helical torsion spring and a one-way coupling that allows the hub to overtake the belt pulley in a driving rotational direction to form an overrunning hub;
a rotationally fixed spring plate that is rotationally fixed relative to the belt pulley or the hub for one end of the helical torsion spring and a rotating spring plate that rotates relative to the belt pulley and the hub for another end of the helical torsion spring;
wherein the rotationally fixed spring plate and the rotating spring plate each rise up to a step axially with a ramp-shape, and spring ends of the helical torsion spring contact the ramp steps to expand the helical torsion spring radially while transferring a drive moment and a friction moment generated in one of the bearing points by the overrunning hub loads the rotating spring plate in a rotational direction of the rotationally fixed spring plate, the other bearing point has a part that is rotationally fixed relative to the rotationally fixed spring plate and on which the rotating spring plate is supported while generating another friction moment that loads the rotating spring plate in the rotational direction of the rotationally fixed spring plate, and the one-way coupling is constructed as a clamping roller overriding clutch that is arranged radially outside of the helical torsion spring, and
the other bearing point is a ball bearing having an inner ring that is mounted on the hub and axially supports the rotating spring plate.

8. The decoupler according to claim 7, wherein the clamping roller overriding clutch extends axially completely outside of a belt groove in the belt pulley.

9. The decoupler according to claim 7, wherein the one bearing point is formed by a sliding bearing ring that surrounds the hub and is enclosed by an inner ring of the clamping roller overriding clutch.

10. The decoupler according to claim 9, wherein the rotating spring plate comprises a cylindrical sheet metal formed part that is mounted in the inner ring of the clamping roller overriding clutch.

11. The decoupler according to claim 10, wherein the rotating spring plate comprises a spring contact part that is held in the sheet metal formed part and on which the ramp step is formed and forms a contact secured against rotation on a radially inward extending collar of the sheet metal formed part.

12. The decoupler according to claim 7, wherein the inner ring of the ball bearing supports the rotating spring plate by a metallic support washer and a sliding bearing washer made from plastic.

13. A decoupler for a belt drive, the decoupler comprising:
a belt pulley adapted to be rotationally driven by a belt;
a hub adapted to rotationally drive a shaft arranged radially inside the belt pulley;

at least two bearing points supporting the belt pulley for rotation on the hub, a first bearing point of the at least two bearing points comprising a clamping roller overriding clutch;
a helical torsion spring and a one-way coupling arranged between the belt pulley and the hub;
a fixed spring plate formed integrally with the hub and engaged with a first end of the helical torsion spring, the fixed spring plate radially surrounding the helical torsion spring and forming a sliding bearing section for the first bearing point of the at least two bearing points; and
a rotatable spring plate that rotates relative to the belt pulley and the hub, and the rotatable spring plate is engaged with a second end of the helical torsion spring.

14. The decoupler of claim 13, wherein a second bearing point of the at least two bearing points is formed as a ball bearing assembly, and the ball bearing assembly includes an inner ring mounted on the hub that axially supports the rotating spring plate.

* * * * *